United States Patent
Kalbassi et al.

[11] Patent Number: 5,855,650
[45] Date of Patent: Jan. 5, 1999

[54] PURIFICATION OF GASES USING SOLID ADSORBENTS

[75] Inventors: Mohammad Ali Kalbassi, Walton-on-Thames, England; Timothy Christopher Golden, Allentown, Pa.

[73] Assignee: Air Products and Chemicals, Inc., Allentown, Pa.

[21] Appl. No.: 926,402

[22] Filed: Sep. 9, 1997

[51] Int. Cl.[6] .......................... B01D 53/04; B01D 53/26
[52] U.S. Cl. ............................. 95/106; 95/115; 95/120; 95/124; 95/139
[58] Field of Search .................... 95/106, 114, 115, 95/118–120, 123, 126, 139

[56] References Cited

U.S. PATENT DOCUMENTS

| | | | |
|---|---|---|---|
| 3,738,084 | 6/1973 | Simonet et al. | 95/139 X |
| 4,233,038 | 11/1980 | Tao | 95/139 X |
| 4,249,915 | 2/1981 | Sircar et al. | 55/26 |
| 4,324,564 | 4/1982 | Oliker | 95/139 X |
| 4,472,178 | 9/1984 | Kumar et al. | 55/25 |
| 4,541,851 | 9/1985 | Bosquain et al. | 55/208 |
| 4,627,856 | 12/1986 | von Gemmingen | 95/120 |
| 4,711,645 | 12/1987 | Kumar | 55/26 |
| 4,986,835 | 1/1991 | Uno et al. | 95/123 X |
| 5,110,569 | 5/1992 | Jain | 95/123 X |
| 5,137,548 | 8/1992 | Grenier et al. | 55/23 |
| 5,232,474 | 8/1993 | Jain | 95/139 X |
| 5,614,000 | 3/1997 | Kalbassi et al. | 95/106 X |
| 5,647,891 | 7/1997 | Blizzard et al. | 95/106 X |
| 5,656,064 | 8/1997 | Golden et al. | 95/96 |
| 5,728,198 | 3/1998 | Acharya et al. | 95/114 |

FOREIGN PATENT DOCUMENTS 0766989   4/1997   European Pat. Off. .

OTHER PUBLICATIONS

Skarstrom, C. W. in "Heatless Fractionation of Gases over Solid Adsorbents", vol. 11, 95, N. W. Li (ED) C.R.C. Press, Cleveland, Ohio 1972.

Von Gemmingen, U. in "Designs of Adsorptive Driers in air separation plants"—Reports on Technology 54/1994–Linde.

"Adsorption Purification for Air Separation Units" M. Grenier et al., Intersociety Cryogenics Symposium, Winter Annual Meeting of ASMI, Dec. 9–14, 1984, New Orleans, LA.

*Primary Examiner*—Robert Spitzer
*Attorney, Agent, or Firm*—Geoffrey L. Chase

[57] ABSTRACT

In the purification of air to remove water and carbon dioxide and other contaminants prior to cryogenic separation of oxygen and nitrogen, water and carbon dioxide are adsorbed on a solid adsorbent and are periodically desorbed to regenerate the adsorbent by the passing of a heated regenerating gas such that the quantity of heat added to the regenerating gas to produce desorption is no more than 90 percent of the heat of adsorption liberated during the adsorption of the water and carbon dioxide. The process is applicable to removing other contaminants from other gas streams also.

13 Claims, 1 Drawing Sheet

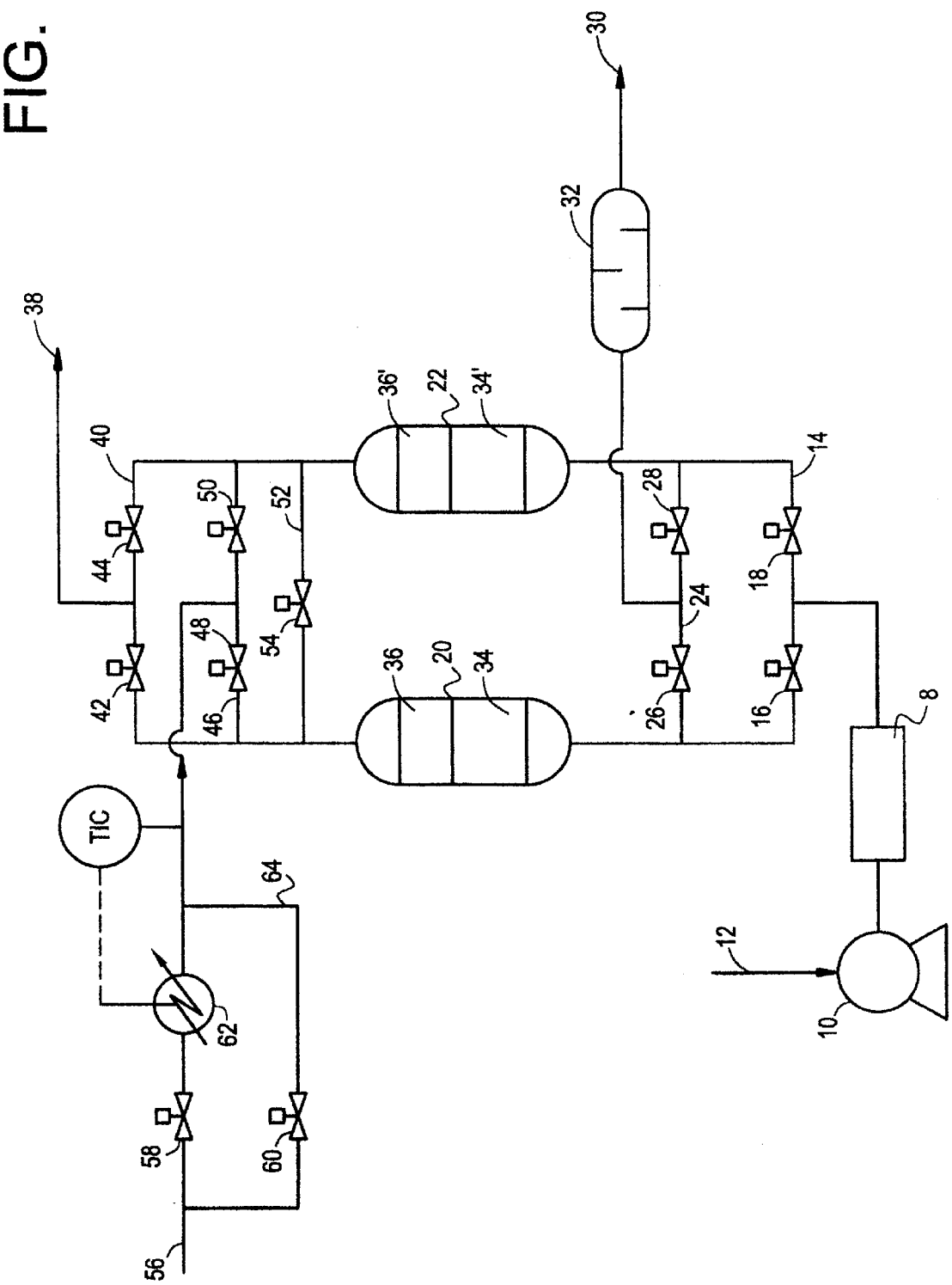

PURIFICATION OF GASES USING SOLID ADSORBENTS

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

The present invention relates to a method of removing a component or components from a gas stream by adsorption onto a solid adsorbent with regeneration of the adsorbent at intervals.

In such methods, the gas stream is fed in contact with a solid adsorbent to adsorb the component to be removed which gradually builds-up in the adsorbent. The concentration of the removed component in the adsorbent will gradually rise. The concentration of the removed gas component in the adsorbent will not be uniform but will be highest at the upstream end of the adsorbent bed and will tail off progressively through a mass transfer zone in the adsorbent. If the process is conducted indefinitely, the mass transfer zone will progressively move downstream in the adsorbent bed until the component which is to be removed breaks through from the downstream end of the bed. Before this occurs, it is necessary to regenerate the adsorbent.

In the pressure swing adsorption PSA system this is done by stopping the flow into the adsorbent of gas to be treated, depressurising the adsorbent and, usually, by passing through the bed counter-current to the product feed direction a flow of a regenerating gas, usually at a lower pressure than the gas to be treated and low in its content of the component adsorbed on the bed.

As the component which is being removed is adsorbed while the bed is on-line, the adsorption process will generate heat of adsorption causing a heat pulse to progress downstream through the adsorbent. During the regeneration process, heat must be supplied to desorb the gas component which has been adsorbed on the bed. In PSA, one aims to commence regeneration before the heat pulse mentioned above has reached the downstream end of the bed. The direction of the heat pulse is reversed by the process of regeneration and the heat which derived from the adsorption of the gas component in question is used for desorbing that component during regeneration. One thus avoids having to add heat during the regeneration step.

An alternative procedure is known as temperature swing adsorption (TSA). In TSA, the cycle time is extended and the heat pulse mentioned above is allowed to proceed out of the downstream end of the adsorbent bed during the feed or on-line period. To achieve regeneration it is therefore necessary to supply heat to desorb the adsorbed gas component. To this end the regenerating gas used is heated for a period to produce a heat pulse moving through the bed counter-current to the normal feed direction. This flow of heated regenerating gas is usually followed by a flow of cool regenerating gas which continues the displacement of the heat pulse through the bed toward the upstream end. TSA is characterised by an extended cycle time as compared to PSA.

Each procedure has its own characteristic advantages and disadvantages. TSA is energy intensive because of the need to supply heat to the regenerating gas. The temperatures needed for the regenerating gas are typically sufficiently high, e.g. 150° C. to 200° C., as to place demands on the system engineering which increase costs. Typically, there will be more than one unwanted gas component which is removed in the process and generally one or more of these components will adsorb strongly and another much more weakly. The high temperature used for regenerating in TSA needs to be sufficient for the desorption of the more strongly adsorbed component. Usually, in order to deal with the need to adsorb differing components from the gas stream at the same time, the optimised TSA system will use a dual adsorbent bed containing a first layer for adsorbing the more strongly adsorbed component (e.g. water) and a second layer for adsorbing a more weakly adsorbed component (e.g. carbon dioxide). Thus, for removing water and carbon dioxide from the gas stream, a TSA system will typically use an adsorbent bed having a first layer of alumina for the removal of water and a second layer of 13X molecular sieve for the removal of carbon dioxide and other minor components. However, the process usually uses either all zeolite compared to alumina and so needs a high regeneration temperature, normally in excess of 100° C. to virtually boil the adsorbed water off the zeolite. To minimise the amount of water which has to be desorbed, it is usual to pre-cool the air to be treated, thus condensing out much of its water content.

The high temperature used in a TSA system give rise to a need for the use of insulated vessels, a purge preheater and an inlet end precooler and generally the high temperatures impose a more stringent and costly mechanical specification for the system. In operation, there is extra energy cost associated with using the purge preheater.

Whilst the PSA system avoids many of these disadvantages by avoiding the need for coping with high temperatures, the short cycle time which characterises PSA brings its own disadvantages. In each cycle of operation the adsorbent is subjected to a feed period during which adsorption takes place followed by depressurisation, regeneration and repressurisation. During depressurisation, the feed gas in the bed is vented off and lost. The amount of feed-gas lost in this way is known as the "switch loss". The short cycle time in the PSA system gives rise to high switch losses. Also, because the cycle is short it is necessary that the repressurisation be conducted quickly. In practice, one has two beds of adsorbent undergoing the above cycles of operation with the cycles being phased with respect to one another that there is always one of the two beds in its feed or on-line period. Accordingly, the time available for repressurisation and regeneration is limited by the time the other bed can spend in the feed part of its cycle which is in turn limited by the short cycle time. The rapid repressurisation implied by these constraints causes transient variations in the feed and product flows which can adversely affect the plant operation, particularly the operation of processes downstream from the adsorption system.

PSA is described by Skarstrom, C. W. in "Heatless Fractionation of Gases over Solid Adsorbents", Vol. 11, 95, N. W. Li(ED) C.R.C. Press, Cleveland, Ohio 1972 and in U.S. Pat. No. 4,711,645 (Kumar).

TSA is described by von Gemmingen, U. in "Designs of Adsorptive driers in air separation plants"—Reports on Technology 54/1994—(Linde) using lower than normal temperatures, i.e. 80° to 130° C. and short cycle times.

A still lower temperature form of TSA is described in U.S. Pat. No. 5,137,548 (Grenier) using a regeneration temperature of 35° C. with a 13X molecular sieve adsorbent. The prior removal of water by cooling the feed air is essential to this process.

U.S. Pat. No. 4,541,851 discloses that one may practise TSA such that the heat pulse is consumed in desorbing both the more strongly and weakly adsorbed components from the adsorbent.

U.S. Pat. No. 4,249,915 and U.S. Pat. No. 4,472,178 disclose an adsorption process in which moisture and carbon and carbon dioxide are removed from atmospheric air by adsorption in separate respective beds. The moisture laden bed is regenerated by pressure swing adsorption in a relatively short operating cycle while the $CO_2$ laden bed is regenerated thermally at considerably longer time intervals. The accomplishment of this naturally necessitates considerably increased apparatus cost in view of the need for separate columns to contain the moisture and carbon dioxide removing beds and additional ancillary equipment. Whilst providing certain benefits, to some extent the teaching of these specifications suffers from the disadvantages of both PSA and TSA. One has the high switch loss and variable output of PSA water removal module and one also has the high energy demand and equipment cost of the TSA carbon dioxide removal module.

EP-A-0766989 discloses the use of alumina followed by molecular sieve for removing carbon dioxide and water from air prior to cryogenic separation. Here the heat pulse produced by heating the regenerating nitrogen rich gas is not consumed in the bed but is halted before it enters the upstream alumina portion of the bed.

In 'Adsorption Purification For Air Separation Units'-M. Grenier et al, Intersociety Cryogenics Symposium, Winter Annual Meeting of ASMI, Dec. 9–14, 1984, New Orleans, La., adsorption of carbon dioxide and water from air is carried out using a bed containing an upstream (having regard to the flow direction during adsorption) portion of alumina and a downstream portion of molecular sieve. Water is adsorbed on the alumina which protects the molecular sieve from the water. Carbon dioxide is adsorbed principally on the molecular sieve.

Regeneration of the adsorbent is achieved by passing heated nitrogen through the adsorbent bed in the direction opposite to the flow direction during adsorption. After a period, the heating of the nitrogen is stopped but the flow of nitrogen is continued. This produces a pulse of heat moving through the adsorbent and the heat in the heat pulse provides energy for desorbing the water and carbon dioxide from the adsorbent. It is indicated that one may seek to arrange for the heat added during the heating of the nitrogen to exactly balance the heat needed for desorption. If the heating is continued for too long, heat will be left in the bed at the end of the regeneration which will interfere with adsorption of water and carbon dioxide when the bed goes back on-line and may be passed into the cryogenic nitrogen/oxygen separator, disturbing its functioning.

It is said that if the heating is discontinued too soon the result will be that part of the bed will not be regenerated. This is seen as being of lesser consequence and so one may provide a very small over-sizing of the alumina bed so that the heat pulse never leaves the bed but dies within the extra alumina during successive cycles.

BRIEF SUMMARY OF THE INVENTION

We have now appreciated that the consequence of allowing the heat pulse to die in the alumina part of the bed need not be that part of the bed is not regenerated. The stream of dry nitrogen which is used for regeneration of course contains heat energy even if it is not heated above its supply temperature. Water and carbon dioxide may be desorbed from an adsorbent such as alumina with the necessary heat being abstracted from such unheated nitrogen, so that the regenerating nitrogen leaves the bed at a temperature below its supply temperature. We have found that by suitable adjustment of the conditions it is possible to achieve regeneration so as to allow repeated cycles of adsorption and regeneration with only a fraction of the heat of desorption being supplied by heating the regenerating gas.

This principle can be applied not only to the removal of water and carbon dioxide from air but more generally.

Accordingly, the present invention provides a method for removing a component from a gas stream comprising:

a) passing the gas stream in a first direction in contact with an adsorbent to adsorb the component from the gas stream on the adsorbent with liberation of heat of adsorption, b) ceasing passing said gas stream in contact with said adsorbent, c) heating a regenerating gas to add heat thereto and to raise the temperature of the regenerating gas to a temperature above that of the gas stream, d) passing said heated regenerating gas in a second direction opposite to said first direction to desorb said gas stream component from said adsorbent for a period such that the heat added to the regenerating gas so passed in contact with the adsorbent is no more than 90% of the heat of the heat of adsorption liberated during the adsorption of the gas component, e) ceasing to heat said regenerating gas and continuing to pass said regenerating gas in an unheated state to continue to desorb said gas stream component from said adsorbent, and f) repeating steps(a) to (e).

Preferably, step (b) further comprises reducing the gas pressure over said adsorbent and said gas pressure is restored prior to or at the commencement of repeating step (a). The regeneration process may then be regarded as having a TSA phase when heat supplied is consumed followed by a PSA phase when heat is abstracted from the unheated purge gas, which therefore exits at a reduced temperature below its unheated inlet temperature.

Preferably, there are at least two vessels containing said adsorbent and said method is operated on each vessel with the steps so phased between the vessels that at least one vessel is in an adsorption phase whilst another is in a regeneration phase.

The quantity of heat added to said regeneration gas is preferably no more than 80% of the heat of the heat of adsorption liberated during the adsorption of the gas component, more preferably no more than 70%, preferably less, e.g. no more than 60% or even 50%, 40% or 30%.

The adsorbent may consist of or comprise alumina for adsorbing water and optionally also carbon dioxide. It may further comprise molecular sieve for adsorbing carbon dioxide, said molecular sieve being located downstream from the alumina in the direction of gas flow during adsorption.

The invention includes a method of separating oxygen and nitrogen in air comprising treating a stream of air containing water and carbon dioxide to remove the water and carbon dioxide therefrom and separating oxygen and nitrogen from the air in a cryogenic separation unit, wherein said removal of carbon dioxide and water is carried out by a method comprising:

a) passing the air in a first direction in contact with an adsorbent to adsorb the water and carbon dioxide from the air on the adsorbent with liberation of heat of adsorption, b) ceasing passing said air in contact with said adsorbent, c) heating a dry, nitrogen rich regenerating gas to add heat thereto and to raise the temperature of the regenerating gas to a temperature above that of the air, d) passing said heated regenerating gas in a second direction opposite to said first direction to desorb said water and carbon dioxide from said adsorbent for a period such that the heat added to the regenerating gas so passed in contact with the adsorbent is no more than 90% of the heat of the heat of adsorption liberated during the adsorption of the water and carbon dioxide, e) ceasing to heat said regenerating gas and continuing to pass said regenerating gas in an unheated state to displace heated regenerating gas through the adsorbent to continue to desorb said water and carbon dioxide from said adsorbent, and f) repeating steps(a) to (e).

Because the heat pulse has to be displaced during regeneration into the water adsorption zone, the cycle time can be as long as in a conventional TSA process but will be shorter than in the processes described in EP-A-0766989.

Preferred operating condition ranges may be summarised as shown in Table 1 below:

TABLE 1

|  |  | Preferred | | More Preferred | |
| --- | --- | --- | --- | --- | --- |
|  |  | Min | Max | Min | Max |
| Pressure | bara | 1 | 20 | 2 | 10 |
| Purge Pressure | bara | 0.5 | 10 | 1.1 | 6 |
| Max Regen Temp | C. | 30 | 200 | 60 | 140 |
| Feed Temp | C. | 5 | 50 | 10 | 40 |
| P/A Ratio |  | 0.05 | 1 | 0.1 | 0.5 |
| % v/v Alumina |  | 0.4 | 0.9 | 0.5 | 0.8 |
| % v/v 13 X or other zeolite |  | 0.6 | 0.1 | 0.5 | 0.2 |
| Bead Size | mm | 0.5 | 6 | 1 | 5 |

BRIEF DESCRIPTION OF SEVERAL VIEWS OF THE DRAWINGS

FIG. 1 schematically illustrates apparatus for use according to a preferred embodiment of the invention.

FIG. 1 shows apparatus for removing carbon dioxide and water from air which is to be passed to a known form of cryogenic air separation unit (not shown) which provides separated oxygen and nitrogen, the latter being in part used as regenerating gas in the illustrated air purification apparatus.

DETAILED DESCRIPTION OF THE INVENTION

As shown in FIG. 1, air to be purified is supplied to a main air compressor system 10 at an inlet 12 in which it is compressed by a multi-stage compressor with inter and after cooling by heat exchange with water. Optionally, the compressed air feed is sub-cooled in a cooler 8. The cooled compressed air is supplied to an inlet manifold 14 containing inlet control valves 16 and 18 to which is connected a pair of adsorbent bed containing vessels 20 and 22. The inlet manifold is bridged downstream of the control valves 16 and 18 by a venting manifold 24 containing venting valves 26, 28 which serve to close and open connections between the upstream end of respective adsorbent vessels 20 and 22 and a vent 30 via a silencer 32. Each of the two adsorbent beds 20 and 22 preferably contains two adsorbents. A lower portion of the adsorbent bed is designated by the numerals 34, 34' in respective beds and upper portion by the numeral 36, 36'. Portion 34, 34' contains activated alumina or modified alumina (as described below) and portion 36, 36' contains zeolite.

The apparatus has an outlet 38 connected to the downstream ends of the two adsorbent vessels 20, 22 by an outlet manifold 40 containing outlet control valves 42, 44. The outlet manifold 40 is bridged by a regenerating gas manifold 46 containing regenerating gas control valves 48 and 50. Upstream from the regenerating gas manifold 46, a line 52 containing a control valve 54 also bridges across the outlet manifold 40.

An inlet for regenerating gas is provided at 56 which through control valves 58 and 60 is connected to pass either through a heater 62 or via a by-pass line 64 to the regenerating gas manifold 46.

The operation of the valves may be controlled by suitable programmable timing and valve opening means as known in the art, not illustrated.

In operation air is compressed in the main compressor system 10 and is fed to the inlet manifold 14 and passes through one of the two vessels containing adsorbent. Starting from a position in which air is passing through open valve 16 to adsorbent vessel 20, and through open valve 42 to the outlet 38, valve 18 in the inlet manifold will just have been closed to cut-off vessel 22 from the feed of air for purification. Valve 44 will just have closed also. At this stage valves 46, 50, 54, 26 and 28 are all closed. Bed 20 is thus on-line and bed 22 is to be regenerated.

To commence depressurisation of bed 22, valve 28 is opened and once the pressure in the vessel 22 has fallen to a desired level, valve 28 is kept open whilst valve 50 is opened to commence a flow of regenerating gas. The regenerating gas will typically be a flow of dry, $CO_2$-free nitrogen obtained from the air separation unit cold box, possibly containing small amounts of argon, oxygen and other gases, to which the air purified in the apparatus shown is passed. Valve 60 is closed and valve 58 is opened so that the regenerating gas is heated to a temperature of for instance 100° C. before passing into the vessel 22. Although the regenerating gas enters the vessel 22 at the selected elevated temperature, it is very slightly cooled by giving up heat to desorb carbon dioxide from the upper, downstream portion 36' of the adsorbent in the vessel. Since the heat pulse is retained and consumed in the system, the exit purge gas emerges from the vent outlet 30 in a cooled state. Progressively, a heat wave moves through the portion 36' of the adsorbent as the carbon dioxide is cleared. After a desired period valve 58 is closed and valve 60 is opened so that the flow of regenerating gas now becomes cool. The cooled regenerating gas displaces the heat pulse further through the portion 34' of the adsorbent.

Whilst the upper portion of the adsorbent and part of the lower portion has been thus regenerated by TSA, the cool regenerating gas has continued to flow through the lower portion of the adsorbent and by virtue of its reduced pressure has desorbed water from the upstream portion of the adsorbent by TSA and in part by PSA. At the end of the allotted regeneration period, valve 50 may be closed to end the flow of regenerating gas and valve 54 may be opened to displace nitrogen from the adsorbent and, after the closing of valve 28, to repressurise the vessel 22 with purified air. Thereafter, valve 54 may be closed and valves 18 and 44 may be opened to put the vessel 22 back on line. The vessel 20 may then be regenerated in a similar manner and the whole sequence continued with the vessels being on-line, depressurising, regenerating, repressurising, and going back on-line in phased cycles of operation.

In accordance with the invention, the heat pulse during regeneration does not penetrate through the whole of the portion of the adsorbent into which water is adsorbed, but is fully dissipated to remove sufficient water and carbon dioxide, such that the remaining regeneration can be produced by the continuing flow of unheated regeneration gas.

The adsorbent used in the apparatus and method described above may be of several kinds. Each of the adsorbent vessels may contain a single type of adsorbent as indicated above or may contain more than one type of adsorbent. Thus one may employ a layered bed containing an upstream layer of alumina followed by a downstream layer of molecular sieve. Alternatively, however one employs an all alumina adsorbent which either all of one type or arranged in layers of different types. Thus for instance the adsorbent may comprise or all be activated alumina or silica alumina as known in the art. Alternatively, it may be an enhanced alumina of the type which may be produced by deposit thereon a basic salt, e.g. approximately 5 percent by weight potassium carbonate on to alumina by treating the starting alumina with a potassium carbonate solution and drying at temperatures of up to 125° C. Such aluminas have a particularly high capacity for carbon dioxide and may be used by themselves or as the upper layer in a two layer bed. They are further described in U.S. Pat. No. 5,656,064.

It should be understood of course that the vessels 20 and 22 can each if desired be separated into smaller vessels arranged in series and references to "layers" of adsorbent above include arrangements in which the separate adsorbents are placed to separate vessels arranged in series.

The molecular sieve may be any one of those known for this purpose in the art, for instance NaY zeolite, 4A zeolite or 13X zeolite.

One may employ a single adsorbent of the kind described in U.S. application Ser. No. 08/814,749 filed $7^{th}$ Mar. 1997 i.e. one comprising a mixture of zeolite and alumina.

EXAMPLE 1

Preferred operating parameters for the use of the apparatus described above in accordance with the invention are set out in the following Table:

TABLE 2

Comparison of conventional TSA (HTTSA), the present invention (TPSA) and conventional PSA.

|  |  | HTTSA | TPSA | PSA |
|---|---|---|---|---|
| No. Beds |  | 2 | 2 | 2 |
| Adsorbent* |  | 1 | 2 | 3 |
| Pressure | bara | 5.2 | 5.2 | 5.2 |
| Feed Temp | °C. | 40 | 40 | 40 |
| On Line | min | 177 | 113.00 | 14.00 |
| Heat Line | min | 55 | 43.00 | 0.00 |
| Max Pulse Temp | °C. | 210 | 100.00 | 30.00 |
| P/A | — | 0.50 | 0.50 | 0.50 |
| Heat Required | kW | 39.42 | 13.57 | 0.00 |
| Regen Power Utilisation | kW/Nm3 · h air | 0.00853 | 0.00294 | 0.00000 |

TABLE 2-continued

Comparison of conventional TSA (HTTSA), the present invention (TPSA) and conventional PSA.

|  |  | HTTSA | TPSA | PSA |
|---|---|---|---|---|
| MAC Power | kW | 326.183 | 326.183 | 326.183 |
| MAC Power | kW/Nm3/h · air | 0.071 | 0.071 | 0.071 |
| Overall Operating Power | kW/Nm3/h · air | 0.0085817 | 0.0030040 | 0.0011097 (due to switch loss) |
| Ratio Supplied/Desorption Heat | — | 1.1 | 0.35 | Zero |

*1 = UOP13X/Alumina
2 = 5 wt % $K_2CO_3$ on Alumina/UOP13X
3 = Alcan AA-300 activated alumina It can be seen that the process according to the invention adds only 35% of the required heat of desorption to the regeneration nitrogen in comparison to a conventional TSA process, thus providing a substantial saving in energy operating costs without additional plant construction costs.

EXAMPLE 2

Alternative conditions for the practising of the invention are as follows:

| Feed Pressure | 2 bara |
|---|---|
| Purge Pressure | 1.1. bara |
| Feed Temperature | 30 C. |
| P/A | 0.7 |
| On-line: | 87 min |
| Heat Time | 40 min |
| Heat supplied/desorption heat | 0.54 |
| Max purge temp | 130 C. |

EXAMPLE 3

Further alternative conditions are as follows:

| Feed Pressure | 10 bra |
|---|---|
| Purge Pressure | 1.1. bara |
| Feed Temperature | 40 C. |
| P/A | 0.45 |
| On-line: | 72 min |
| Heat Time | 25 min |
| Heat supplied/desorption heat | 0.35 |
| Max purge temp | 82 C. |

We claim:

1. A method for removing a component from a gas stream comprising the steps of:

a) passing the gas stream in a first direction in contact with an adsorbent to adsorb the component from the gas stream on the adsorbent with liberation of heat of adsorption, b) ceasing passing said gas stream in contact with said adsorbent, c) heating a regenerating gas to add heat thereto and to raise the temperature of the regenerating gas to a temperature above that of said gas stream, d) passing said regenerating gas in a second direction opposite to said first direction to desorb said gas stream component from said adsorbent for a period such that the heat added to the regenerating gas so passed in contact with the adsorbent is no more than 90% of the heat of adsorption liberated during the adsorption of said gas component, e) ceasing to heat said regenerating gas and continuing to pass said regenerating gas in an unheated state to continue to desorb said gas stream component from said adsorbent, and f) repeating steps(a) to (e).

2. A method as claimed in claim 1, wherein step (b) further comprises reducing the gas pressure over said adsorbent and wherein said gas pressure is restored prior to or at the commencement of repeating step (a).

3. A method as claimed in claim 1, wherein there are at least two vessels containing said adsorbent and said method is operated on each vessel with the steps so phased between the vessels that at least one vessel is in step a) whilst another is in steps d) and/or e).

4. A method as claimed in claim 1, wherein said heat added to said regeneration gas is no more than 80% of the heat of adsorption liberated during the adsorption of said gas component.

5. A method as claimed in claim 1, wherein said heat added to said regeneration gas is no more than 50% of the heat of adsorption liberated during the adsorption of said gas component.

6. A method as claimed in claim 1, wherein said heat added to said regeneration gas is no more than 30% of the heat of adsorption liberated during the adsorption of said gas component.

7. A method as claimed in claim 1, wherein the adsorbent comprises alumina for adsorbing water and optionally also carbon dioxide.

8. A method as claimed in claim 7, wherein the adsorbent further comprises molecular sieve for adsorbing carbon dioxide and wherein said molecular sieve is located downstream from the alumina in the direction of gas flow during adsorption.

9. A method as claimed in claim 8, wherein the volume ratio of molecular sieve to alumina is from 0.1 to 0.6.

10. A method as claimed in claim 7, wherein the adsorbent comprises a mixture of said alumina and a molecular sieve.

11. A method as claimed in claim 7, wherein the alumina has been treated by depositing thereon a basic salt.

12. A method as claimed in claim 1, wherein the adsorbent has an effective bead diameter of from 1 to 5 mm.

13. A method of separating oxygen and nitrogen in air comprising treating a stream of air containing water and carbon dioxide to remove the water and carbon dioxide therefrom and separating oxygen and nitrogen from the air in a cryogenic separation unit, wherein removal of carbon dioxide and water is carried out by a method comprising the steps of:

a) passing the air in a first direction in contact with an adsorbent to adsorb the water and carbon dioxide from the air on the adsorbent with liberation of heat of adsorption, b) ceasing passing said air in contact with said adsorbent, c) heating a dry, nitrogen rich regenerating gas to add heat thereto and to raise the temperature of the regenerating gas to a temperature above that of said air, d) passing said regenerating gas in a second direction opposite to said first direction to desorb said water and carbon dioxide from said adsorbent for a period such that the heat added to the regenerating gas so passed in contact with the adsorbent is no more than 90% of the heat of adsorption liberated during the adsorption of said water and carbon dioxide, e) ceasing to heat said regenerating gas and continuing to pass said regenerating gas in an unheated state to continue to desorb said water and carbon dioxide from said adsorbent, and f) repeating steps(a) to (e).

\* \* \* \* \*